United States Patent
Hochstetter

(10) Patent No.: US 12,194,709 B2
(45) Date of Patent: Jan. 14, 2025

(54) MULTILAYER STRUCTURE FOR TRANSPORTING OR STORING GAS OR FOR EXPLOITING OFFSHORE OIL DEPOSITS UNDER THE SEA

(71) Applicant: Arkema France, Colombes (FR)

(72) Inventor: Gilles Hochstetter, Colombes (FR)

(73) Assignee: ARKEMA FRANCE, Colombes (FR)

( * ) Notice: Subject to any disclaimer, the term of this patent is extended or adjusted under 35 U.S.C. 154(b) by 336 days.

(21) Appl. No.: 17/629,130

(22) PCT Filed: Jul. 28, 2020

(86) PCT No.: PCT/FR2020/051385
§ 371 (c)(1),
(2) Date: Jan. 21, 2022

(87) PCT Pub. No.: WO2021/019180
PCT Pub. Date: Feb. 4, 2021

(65) Prior Publication Data
US 2022/0243843 A1    Aug. 4, 2022

(30) Foreign Application Priority Data
Jul. 30, 2019    (FR) ...................................... 1908668

(51) Int. Cl.
| | |
|---|---|
| *B32B 15/088* | (2006.01) |
| *B29C 48/152* | (2019.01) |
| *B29C 63/00* | (2006.01) |
| *B29C 63/34* | (2006.01) |
| *B32B 1/00* | (2006.01) |
| *B32B 1/08* | (2006.01) |
| *B32B 5/02* | (2006.01) |
| *B32B 27/12* | (2006.01) |
| *B32B 27/34* | (2006.01) |
| *F16L 9/147* | (2006.01) |
| *F16L 9/16* | (2006.01) |
| *B29K 77/00* | (2006.01) |
| *B29L 23/00* | (2006.01) |

(52) U.S. Cl.
CPC .......... *B32B 15/088* (2013.01); *B29C 48/152* (2019.02); *B29C 63/0017* (2013.01); *B29C 63/34* (2013.01); *B32B 1/00* (2013.01); *B32B 1/08* (2013.01); *B32B 5/02* (2013.01); *B32B 27/12* (2013.01); *B32B 27/34* (2013.01); *F16L 9/147* (2013.01); *F16L 9/165* (2013.01); *B29K 2077/00* (2013.01); *B29L 2023/22* (2013.01)

(58) Field of Classification Search
CPC .......... B32B 15/088; B32B 1/00; B32B 1/08; B32B 5/02; B32B 27/12; B32B 27/34; B32B 2262/04; B32B 2262/065; B32B 2262/08; B32B 2264/108; B32B 2307/306; B32B 7/027; B32B 7/04; B32B 15/02; B32B 27/285; B32B 27/288; B32B 27/36; B32B 37/04; B32B 37/06; B32B 2260/021; B32B 2260/023; B32B 2260/046; B32B 2262/0253; B32B 2262/0269; B32B 2262/106; B32B 2262/108; B32B 2307/30; B32B 2597/00; B29C 48/152; B29C 63/0017; B29C 63/34; B29K 2077/00; B29L 2023/22; F16L 9/147; F16L 9/165
See application file for complete search history.

(56) References Cited

U.S. PATENT DOCUMENTS

| | | | |
|---|---|---|---|
| 2009/0071595 A1 | 3/2009 | Matz et al. | |
| 2014/0020819 A1 | 1/2014 | Kremers | |
| 2015/0083264 A1 | 3/2015 | Choo et al. | |
| 2017/0158856 A1* | 6/2017 | Jung | ...................... B29C 48/03 |
| 2018/0172185 A1 | 6/2018 | Ishii et al. | |
| 2020/0377773 A1 | 12/2020 | Briffaud et al. | |

FOREIGN PATENT DOCUMENTS

| | | |
|---|---|---|
| CN | 109071803 A | 12/2018 |
| EP | 1505099 A2 | 2/2005 |
| EP | 2851190 A1 | 3/2015 |

(Continued)

OTHER PUBLICATIONS

Office Action with English translation mailed on Feb. 28, 2024, by the Japanese Patent Office for Japanese Application No. 2022-504517, 14 pages.

International Search Report (PCT/ISA/210) and Written Opinion (PCT/ISA/237) received for PCT Patent Application No. PCT/FR2020/051386, mailed on Oct. 16, 2020, 19 pages including 9 pages of English Translation.

International Search Report (PCT/ISA/210) with translation and Written Opinion (PCT/ISA/237) mailed on Oct. 15, 2020, by the European Patent PCT/FR2020/051385. (13 pages).

*Primary Examiner* — James C Yager
(74) *Attorney, Agent, or Firm* — Boone IP Law

(57) ABSTRACT

A multilayer structure for transporting or storing gas or for exploiting oil or gas deposits under the sea, including, from the inside to the outside, at least one sealing layer and at least one composite reinforcing layer, the innermost composite reinforcing layer being welded to the outermost adjacent sealing layer, the sealing layers of a composition including at least one semi-crystalline thermoplastic polymer, the Tm of which is less than 280° C., wherein at least one of the composite reinforcing layers of a fibrous material in the form of continuous fibers impregnated with a composition including at least one thermoplastic polymer, the thermoplastic polymer having a Tg greater than the maximum temperature of use of the structure (Tu), with Tg≥Tu+20° C., Tu being greater than 50° C., and a multilayer structure selected from a reservoir, a pipe or a tube for transporting or storing hydrogen being excluded.

19 Claims, No Drawings

(56) References Cited

FOREIGN PATENT DOCUMENTS

| | | |
|---|---|---|
| EP | 3309438 A1 | 4/2018 |
| FR | 2964173 A1 | 3/2012 |
| FR | 3049952 A1 | 10/2017 |
| FR | 3059072 A1 | 5/2018 |
| WO | 03074258 A1 | 9/2003 |
| WO | 2012118379 A1 | 9/2012 |
| WO | 2017191735 A1 | 11/2017 |
| WO | WO-2018091693 A1 * 5/2018 ............... B32B 1/08 |

* cited by examiner

MULTILAYER STRUCTURE FOR TRANSPORTING OR STORING GAS OR FOR EXPLOITING OFFSHORE OIL DEPOSITS UNDER THE SEA

TECHNICAL FIELD

The present patent application relates to composite multilayer structures for transporting or storing gas or for exploiting oil or gas deposits under the sea, and to the method for manufacturing said structures.

PRIOR ART

The exploitation of oil deposits located at sea subjects the materials used to extreme conditions, and in particular the pipes connecting the various underwater devices of the platform and conveying the extracted hydrocarbons, which are generally transported at high temperature and high pressure (for example, 700 bar).

During the operation of the facilities, there are therefore severe problems of mechanical strength and thermal and chemical resistance of the materials used. Such pipes must in particular withstand hot oil, gas, water, and mixtures of at least two of these products for periods of up to 20 years.

Conventionally, these pipes comprise a metal, non-sealed inner layer formed by a helically wound profiled metal strip, such as a lock-seamed strip. This metal inner layer, which gives the pipe its shape, is coated, generally by extrusion, with a polymer layer intended to provide sealing.

This sheath must mainly:
- be able to be continuously extruded, optionally on the support of the internal carcass,
- be sufficiently flexible to accommodate the curvatures applied to the flexible pipe during the operations of manufacturing, laying and use of the flexible pipe on site (motion due to swell or lifting of the flexible pipe to change the site of use),
- withstand creep following compressive forces, aggravated by the temperature level. Creep occurs in the gaps (space or play) between the metal reinforcements (for example Z-shaped self lock seams or T-shaped seams) on which the sheath bears when the pipeline is pressurized by the transported effluent,
- be sufficiently chemically stable in order for its mechanical characteristics and its sealing not to deteriorate in a way that would be prohibitive during the life of the flexible pipe.

For transporting or storing gas or for exploiting oil and gas deposits, it is beneficial to use composite pipes composed of this sealing sheath, also referred to as liner (providing sealing and chemical and abrasion resistance of the pipe), reinforced by an outer, adhesive layer made of composite material, which is manufactured by filament winding from unidirectional (UD) tapes deposited in successive layers on the liner, with one or more angles of orientation relative to the axis of the pipe so as to provide sufficient flexibility to the composite pipe. The composite reinforcement enables the pipe to withstand pressure (internal pressure of the fluid and external pressure in the event of use at sea at a great depth).

This technology is that developed by the company Airborne, for example in document FR 2964173.

More recently, Technip (WO2012118379) has shown an interest in this pipe concept in combination with a metal external reinforcement with a view to doing away with the internal carcass of current offshore flexible pipes, and optionally the metal reinforcement composing the pressure arch.

However, the solutions envisioned for this type of composite pipes are based on using the same polymer for the liner and for the matrix of the composite in order to guarantee excellent and durable adhesion between the liner and the composite.

For example, Airborne has developed a variety of flexible pipes, without an internal carcass and with a sealing sheath adhered to the composite reinforcement, comprising:

a PA 11 liner with a PA11 FC composite (JIP completed in 2011) or a PA12 liner with PA12 FC composite or even a PVDF liner with a PVDF FC composite. However, all these structures have the disadvantage that the matrix of the composite reinforcement has a glass transition temperature, Tg, lower than the temperature of use, Tu, of the pipe; that is, in the case of pipes based on PA11 or PA12, a Tg of 50° C. in the dry state for a temperature of use, Tu, of the pipe of 60 to 80° C. and in the case of PVDF, a Tg of −40° C., for a temperature of use in continuous operation above 100° C. and often close to 130° C. In the particular case of PVDF, the rigidity (modulus) of the matrix remains high above its Tg until it reaches another transition, the alpha transition at around 100° C., beyond which its behavior becomes purely rubbery. Thus, in all the above industrial and commercial cases of TP matrix composite pipes, the matrix of the composite reinforcement is in a fully rubberized state at the composite pipe temperature of use Tu.

To remedy this problem and to have a composite reinforcement whose matrix has a Tg higher than the maximum temperature of use, so as not to be in a rubberized state at the temperature of use, in this case 130° C., Kutting & Total, then Vitrex and Magma, have developed a solution composed of a PEEK sealing sheath (or liner) reinforced by a composite with a PEEK matrix, also. The Tg of PEEK is 140° C. and therefore meets the requirement of high rigidity because this Tg is higher than the maximum temperature of use. The disadvantage is that, as a result, the sealing sheath (liner) is also very rigid, which can limit its fatigue resistance and is a major disadvantage for the production of flexible pipes. In addition, the processing temperature of this type of sealing sleeve is very high (typically 380-400° C.) and in the case of the usual transformation process, which is tube extrusion, this poses major difficulties in terms of tooling and process control.

In addition, Ticona (Celanese), in partnership with Airborne, offers a composite pipe comprising a PPS FC reinforcement and a PPS sealing sheath.

For Tus>90° C., this structure poses the same problem for the composite matrix as the PVDF-based solution (that is Tg<Tu), but additionally presents the problem of transformation temperature (typically 350° C. vs. 250° C., for PPS and PVDF, respectively).

For Tus<90° C., PPS is suitable for the matrix of the composite, but the problem of the extrusion temperature of the sealing sheath (liner) remains, as does the problem of its high rigidity, which limits the flexibility of the composite pipe, and the problem of its low fatigue resistance due to a Tg which is greater than the Tu.

Thus, it remains to optimize, on the one hand, the matrix of the composite so as to optimize its mechanical strength at high temperature and, on the other hand, the material making up the sealing liner, so as to optimize its application temperature, without degrading the adhesion of the composite reinforcement to the sealing liner. Thus, the optional modification of the composition of the material composing the sealing sheath, which will be carried out to ensure at least partial miscibility with the matrix of the composite, must not result in a significant increase in the extrusion temperature of this liner compared to what is currently practiced with polyamides and PVDFs (that is remaining <300° C., preferably <290° C., even more preferentially <250° C.).

These problems are solved by providing a multilayer structure and especially a flexible pipe of the present invention, which is a fully bonded, "bi-material" composite pipe, and composed of a high-strength composite reinforcement, deposited in particular by filament winding on a liner extruded beforehand at relatively low temperature. The adhesion between the composite and the liner is very good.

The present invention therefore relates to a multilayer structure selected from a reservoir, a pipe or a tube, for transporting or storing gas or for exploiting oil or gas deposits under the sea, comprising, from the inside to the outside, at least one sealing layer and at least one composite reinforcing layer, said innermost composite reinforcing layer being welded to said outermost adjacent sealing layer, said sealing layers consisting of a composition predominantly comprising at least one semi-crystalline thermoplastic polymer P1i (i=1 to n, n being the number of sealing layers), the Tm of which, as measured according to ISO 11357-3: 2013, is less than 280° C., in particular less than 265° C., said at least one thermoplastic polymer of each sealing layer may be the same or different, and at least one of said composite reinforcing layers consisting of a fibrous material in the form of continuous fibers impregnated with a composition predominantly comprising at least one thermoplastic polymer P2j, (j=1 to m, m being the number of reinforcing layers), in particular semi-crystalline, said thermoplastic polymer P2j having a Tg, as measured according to ISO 11357-3: 2013, greater than the maximum temperature of use of said structure (Tu), with Tg≥Tu+20° C., Tu being greater than 50° C., in particular greater than 100° C.

the hydrogen being excluded from said gas transport or gas storage, and a multilayer structure intended for transporting hydrogen selected from a reservoir, a pipe or a tube being excluded.

Thus, the Inventors unexpectedly found that using a different polymer for the composite matrix and the liner and in particular:

a matrix of the composite reinforcement composed of a polymer having a Tg significantly greater than the maximum temperature of use of the reservoir or pipe, Tu, (Tg>Tu+20° C., typically) so as to remain in its glassy domain and to have a high rigidity, thus enabling the composite to have a high mechanical strength, the semi-crystalline polymer making up the liner having a low melting point, Tm, allowing it to be processed by extrusion, extrusion blow molding, rotational molding, injection or by winding of a pure resin film, as the case may be, at a moderate temperature which is customary for the person skilled in the art, in relation to the Tm of this polymer, which is less than 280° C., preferably less than 265° C. Semi-crystalline polymers of low Tm known to date also have a low Tg, which in most cases will be below the maximum temperature of use. As a result, the polymer making up the liner will work in its rubberized domain and will therefore be very flexible and therefore very resistant to fatigue. Its semi-crystalline nature ensures good resistance to chemical aggression, abrasion and creep, and, the two aforementioned polymers (the one composing the matrix of the composite and the one composing the liner) are sufficiently miscible to ensure the weldability of the composite to the liner and, consequently, an excellent adhesion between the liner and the composite. The durability of the adhesion will be guaranteed by the durability of the material constituting the mixture at the interface of the two materials, that is in the welded joint. The miscibility of the two polymers is expressed, preferably by a single Tg, or failing that, by a characteristic signature of a partially homogeneous mixture, for example by the presence of two Tg values intermediate to the Tg of the two pure polymers.

An immiscibility of two polymers results in the presence of two Tg in the mixture of the two polymers which correspond to the respective Tg of the pure polymers taken separately.

By "multilayer structure" is meant, for example, a reservoir, pipe or tube, comprising or consisting of several layers, in particular two layers.

The term "gas" denotes any gas, and in particular the undersea extraction gas, especially natural gas, excluding hydrogen.

The sealing layer or layers are the innermost layers compared to the composite reinforcing layers which are the outermost layers.

The sealing layer is in contact with the gas or the oil and gas extracted under the sea, even if an inner, and thus innermost, non-sealing metallic layer, formed by a helically wound profiled metal strip such as a lock-seamed strip to form said carcass, is present on which the sealing layer(s) is (are) coated by extrusion.

When several sealing layers are present, only the innermost of the sealing layers is in direct contact with the gas or the oil and gas extracted under the sea.

When only a sealing layer and a composite reinforcing layer are present, thus leading to a two-layer multilayer structure, then those two layers are welded and thus adhere to each other, in direct contact with each other.

When several sealing layers and/or several composite reinforcing layers are present, the outermost layer of said sealing layers, and thus the one opposite the layer in contact with the gas or the oil and gas extracted under the sea, is welded to the innermost layer of said composite reinforcing layers, and thus adhered to each other, in direct contact with each other.

The other composite reinforcing layers are also welded together.

The other sealing layers are also welded together.

Regarding the Sealing Layer(s) and the Thermoplastic Polymer Phi

One or more sealing layers may be present.

Each of said layers consists of a composition predominantly comprising a at least one thermoplastic polymer P1i, i corresponding to the number of layers present. i is from 1 to 10, in particular from 1 to 5, especially from 1 to 3, preferentially i=1.

The term "predominantly" means that said at least one polymer is present in excess of 50% by weight relative to the total weight of the composition.

Advantageously, said at least one predominant polymer is present at more than 60% by weight, especially at more than 70% by weight, particularly at more than 80% by weight, more particularly greater than or equal to 90% by weight 90% by weight, relative to the total weight of the composition.

Said composition may further comprise impact modifiers and/or additives.

The additives may be chosen from an antioxidant, a heat stabilizer, a UV absorber, a light stabilizer, a a lubricant, an inorganic filler, a flame-retardant agent, a nucleating agent, a plasticizer, a dye, carbon black, and carbonaceous nano-fillers.

Advantageously, said composition predominantly consists of said thermoplastic polymer P1i, from 0 to 5% by weight of impact modifier, from 0 to 5% by weight of additives, the sum of the constituents of the composition being equal to 100% (based on a maximum P2i of 90%.

Said at least one predominant polymer in each layer may be the same or different.

In one embodiment, a single predominant polymer is present in at least the sealing layer welded to the composite reinforcing layer.

Thermoplastic Polymer P1i

Thermoplastic, or thermoplastic polymer, refers to a semi-crystalline material that is generally solid at ambient temperature, and which softens during a temperature increase, in particular after passing its glass transition temperature (Tg), and may exhibit a sharp transition upon passing what is referred to as its melting point (Tm), and which becomes solid again when the temperature decreases below its crystallization temperature.

The Tg, the Tc and the Tm are determined by differential scanning calorimetry (DSC) according to standards 11357-2:2013 and 11357-3:2013, respectively.

The number-average molecular weight Mn of said thermoplastic polymer is preferably in a range from 10 000 to 40 000, preferably from 12 000 to 30 000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

Examples of suitable semi-crystalline thermoplastic polymers in the present invention include:

polyamides, including copolymers, for example polyamide-polyether copolymers, polyesters, PVDF and a PVDF/PEI blend wherein PVDF is predominant.

More particularly preferred among the semi-crystalline polymers are polyamides and their semi-crystalline copolymers.

The nomenclature used to define the polyamides is described in ISO standard 1874-1:2011 "Plastiques—Matériaux polyamides (PA) pour moulage et extrusion—Partie 1: Désignation", especially on page 3 (Tables 1 and 2) and is well known to the skilled person.

The polyamide may be a homopolyamide or a co-polyamide or a mixture thereof.

Advantageously, said thermoplastic polymer is a long-chain aliphatic polyamide, that is to say a polyamide having an average number of carbon atoms per nitrogen atom greater than 8.5, preferably greater than 9.

In particular, the long-chain aliphatic polyamide is selected from:

polyamide 11 (PA11), polyamide 12 (PA12), polyamide 1010 (PA1010), polyamide 1012 (PA1012), polyamide 1212 (PA1012), or a mixture thereof or a copolyamide thereof, in particular PA11 and PA12.

Advantageously, said thermoplastic polymer is a long-chain semi-aromatic polyamide, i.e. a polyamide having an average number of carbon atoms per nitrogen atom of greater than 8.5, preferably of greater than 9, and a melting point of between 240 and 280° C.

In particular, the long-chain semi-aromatic polyamide is chosen from polyamide 11/5T or 11/6T or 11/10T. Obviously, in this case, the content of 11 must be carefully chosen such that the Tm of said polymers is less than 280° C., preferably less than 265° C.

Advantageously, each sealing layer consists of a composition comprising the same type of polymer, in particular a polyamide.

Advantageously, said composition comprising the said polymer P1i is black in color and capable of absorbing radiation suitable for welding.

There are various methods for welding thermoplastic polymer parts. Thus, contact or non-contact heating blades, ultrasound, infrared, vibrations, rotation of one element to be welded against the other or even laser welding may be used.

The welding of thermoplastic polymer elements, in particular by laser welding, requires that the two elements to be welded have different properties with respect to radiation, in particular laser radiation: one of the elements must be transparent to radiation, in particular laser radiation, and the other must absorb the radiation, in particular laser radiation. The radiation in particular laser radiation passes through the transparent part and then reaches the absorbing element, where it is converted into heat. This allows the contact area between the two elements to melt and thus the welding to take place.

In some applications, it is desirable that both parts to be welded are black, including the part that is transparent to laser radiation.

In order to make them absorbent, it is known to add various additives, including for example carbon black, which gives the polymer a black color and allows it to absorb radiation suitable for welding.

In one embodiment, the welding is performed by a system selected from laser, IR heating or induction heating.

In the case where the welding is carried out by laser welding, then the composition P1 i comprises non-agglomerated or non-aggregated carbonaceous fillers.

In the case where the welding is carried out by induction, then the composition P1i comprises metallic particles.

Advantageously, the welding is performed by a laser system.

Regarding the Composite Reinforcing Layer and the Thermoplastic Polymer P2j

One or more composite reinforcing layers may be present.

Each of the said layers consists of a composition predominantly comprising at least one thermoplastic polymer P2j, j corresponding to the number of layers present.

j is comprised from 1 to 10, particularly from 1 to 5, especially from 1 to 3, preferentially j=1.

The term "predominantly" means that said at least one polymer is present in excess of 50% by weight relative to the total weight of the composition.

Advantageously, said at least one predominant polymer is present at more than 60% by weight, especially at more than 70% by weight, particularly at more than 80% by weight, more particularly greater than or equal to 90% by weight, relative to the total weight of the composition.

Said composition may further comprise impact modifiers and/or additives.

The additives may be chosen from an antioxidant, a heat stabilizer, a UV absorber, a light stabilizer, a lubricant, an inorganic filler, a flame retardant agent, a nucleating agent, a plasticizer, and a dye.

Advantageously, said composition predominantly consists of said thermoplastic polymer P2j, from 0 to 5% by weight of impact modifier, from 0 to 5% by weight of additives, the sum of the constituents of the composition being equal to 100% (based on a maximum P2j of 90%.

Said at least one predominant polymer in each layer may be the same or different.

In one embodiment, a single predominant polymer is present at least in the composite reinforcing layer welded to the sealing layer.

In one embodiment, each reinforcing layer comprises the same type of polymer, in particular a polyamide.

Thermoplastic Polymer P2j

Thermoplastic, or thermoplastic polymer, is intended to mean a material that is generally solid at ambient temperature, which may be semi-crystalline or amorphous, in particular semi-crystalline, and that softens during a temperature increase, in particular after passing its glass transition temperature (Tg), and flows at a higher temperature when it is amorphous, or that may exhibit precise melting upon passing its melting point (Tm) when it is semi-crystalline, and which becomes solid again when the temperature decreases to below its crystallization temperature (for a semi-crystalline) and below its glass transition temperature (for an amorphous).

The Tg, the Tc, and the Tm are determined by differential scanning calorimetry (DSC) according to standards 11357-2:2013 and 11357-3:2013, respectively.

The polymer P2j of the composition of at least one of said composite reinforcing layers is such that its Tg is greater than the maximum temperature of use (Tu) of said structure and, in particular, the Tg≥Tu+20° C.

In one embodiment, the polymer P2j has a Tg≥Tu+20° C., regardless of the position of said reinforcing layer.

In another embodiment, said reinforcing layer consisting of a composition comprising the polymer P2j has a Tg≥Tu+20° C. is the layer welded to said sealing layer.

In another embodiment, said reinforcing layer consisting of a composition comprising the polymer P2j has a Tg≥Tu+20° C. is the outermost reinforcing layer of the structure. The number-average molecular weight Mn of said thermoplastic polymer is preferably in a range from 10 000 to 40 000, preferably from 12 000 to 30 000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

Examples of suitable semi-crystalline thermoplastic polymers in the present invention include:
  polyamides, in particular comprising an aromatic and/or cycloaliphatic structure, including copolymers, for example polyamide-polyether copolymers, polyesters,
  polyaryletherketones (PAEK),
  polyetheretherketones (PEEK),
  polyetherketoneketones (PEKK),
  polyetherketone etherketone ketones (PEKEKK),
  polyimides, in particular polyetherimides (PEI) or polyamide-imides,
  polylsulfones (PSU), in particular polyarylsulfones such as polyphenylsulfones (PPSU),
  polyethersulfones (PES).

Semi-crystalline polymers are more particularly preferred, and in particular polyamides and their semi-crystalline copolymers.

The nomenclature used to define the polyamides is described in ISO standard 1874-1:2011 "Plastiques—Matériaux polyamides (PA) pour moulage et extrusion—Partie 1: Désignation", especially on page 3 (Tables 1 and 2) and is well known to the skilled person.

The polyamide may be a homopolyamide or a co-polyamide or a mixture thereof.

Advantageously, the semi-crystalline polyamides are semi-aromatic polyamides, especially a semi-aromatic polyamide of formula X/YAr, as described in EP1505099, especially a semi-aromatic polyamide of formula A/XT wherein A is selected from a unit obtained from an amino acid, a unit obtained from a lactam and a unit corresponding to the formula (Ca diamine).(Cb diacid), with a representing the number of carbon atoms of the diamine and b representing the number of carbon atoms of the diacid, a and b each being between 4 and 36, advantageously between 9 and 18, the unit (Ca diamine) being selected from linear or branched aliphatic diamines, cycloaliphatic diamines and alkylaromatic diamines and the unit (Cb diacid) being selected from linear or branched aliphatic diacids, cycloaliphatic diacids and aromatic diacids;

X.T denotes a unit obtained from the polycondensation of a Cx diamine and terephthalic acid, with x representing the number of carbon atoms of the Cx diamine, x being between 6 and 36, advantageously between 9 and 18, especially a polyamide of formula A/6T, A/9T, A/10T, or A/11T, A being as defined above, in particular a polyamide selected from a PA MPMDT/6T, a PA11/10T, a PA 5T/10T, a PA 11/BACT, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/6T, PA 11/MPMDT/10T, PA 11/BACT/10T, a PA 11/MXDT/10T, an 11/5T/10T.

T corresponds to terephthalic acid, MXD corresponds to m-xylylene diamine, MPMD corresponds to methylpentamethylene diamine and BAC corresponds to bis(aminomethyl)cyclohexane.

Advantageously, each composite reinforcing layer consists of a composition comprising the same type of polymer, in particular a polyamide.

Advantageously, said composition comprising said polymer P2j is transparent to radiation suitable for welding.

Thermoplastic polymers are generally transparent for welding purposes, especially laser welding. Carbonaceous nanofillers make it possible to impart a black color to a layer of a composition comprising a thermoplastic polymer, while maintaining the transparency to laser radiation of said layer.

Advantageously, the carbonaceous nanofillers are non-agglomerated or non-aggregated.

Advantageously, the carbonaceous nanofillers are incorporated into the composition in an amount from 100 ppm to 500 ppm, and preferably from 100 ppm to 250 ppm.

Advantageously, the carbonaceous nanofillers are selected from carbon nanotubes (CNTs), carbon nanofibers, graphene, nanoscale carbon black and mixtures thereof.

Advantageously, the carbonaceous nanofillers are free of nanometric carbon black.

In one embodiment, the welding is performed by a system selected from laser, IR heating or induction heating.

Advantageously, the welding is performed by a laser system.

Advantageously, the laser radiation is infrared laser radiation, and preferably has a wavelength between 700 nm and 1200 nm and preferably between 800 nm and 1100 nm.

Regarding the Structure

Said multilayer structure thus comprises at least one sealing layer and at least one composite reinforcing layer which are welded together.

In one embodiment, in said multilayer structure, each polymer P1i of each sealing layer is partially or fully miscible with each polymer P1i of the adjacent layer(s), each polymer P2j of each reinforcing layer is partially or fully miscible with each polymer P2j of the adjacent layer(s), and each polymer P2j is partially or fully miscible with each polymer P1i when they are adjacent, and polymer P21 is partially or fully miscible with polymer P11 adjacent thereto, the total or partial miscibility of the said polymers being defined by the difference in glass transition temperature of the two resins, in the mixture, with respect to the difference in glass transition temperature of the two resins, before the mixture, and the miscibility being total when said difference is equal to 0, and the miscibility being partial, when said difference is different from 0, an immiscibility of the polymer P2j with the polymer P1i being excluded.

When the miscibility of said polymers is partial, said difference is said miscibility is greater the smaller said difference is.

Advantageously, when the miscibility of said polymers is partial, said difference is less than 30%, preferentially less than 20%, in absolute value.

In one embodiment, the glass transition temperature(s) of the mixture, depending on whether the miscibility is full or partial, which must be between the glass transition temperatures of said polymers prior to blending and different thereof, of at least 5° C., preferably at least 10° C.

The expression "fully miscible" means that when, for example, two polymers $P1_1$ and $P1_2$ having respectively a $Tg1_1$ and a $Tg1_2$ are present in two adjacent sealing layers or two adjacent reinforcing layers, then the mixture of the two polymers has only one $Tg1_11_2$, the value of which is between $Tg1_1$ and a $Tg1_2$.

This $Tg1_11_2$ value is then greater than $Tg1_1$ by at least 5° C., in particular by at least 10° C. and lower than $Tg1_2$ by at least 5° C., in particular by at least 10° C.

The expression "partially miscible" means that when, for example, two polymers $P1_1$ and $P1_2$ having respectively a $Tg1_1$ and a $Tg1_2$ are present respectively in two adjacent sealing layers or two adjacent reinforcing layers, then the mixture of the two polymers has two Tgs: $Tg'1_1$ and $Tg'1_2$, where $Tg1_1<Tg'1_1<Tg'1_2<Tg1_2$.

These $Tg'1_1$ and $Tg'1_2$ values are then greater than $Tg1_1$ by at least 5° C., in particular by at least 10° C. and lower than $Tg1_2$ by at least 5° C., in particular by at least 10° C.

An immiscibility of two polymers results in the presence of two Tgs, $Tg1_1$ and $Tg1_2$, in the mixture of the two polymers which correspond to the respective Tgs, $Tg1_1$ and $Tg1_2$, of the pure polymers taken separately.

Advantageously, said welded sealing and reinforcing layers are made of compositions which respectively comprise different polymers.

Nevertheless, said different polymers may be of the same type.

Thus, if one of the two welded composite reinforcing and sealing layers is made of a composition comprising an aliphatic polyamide, then the other layer is made of a composition comprising a polyamide which is not aliphatic and which is for example a semi-aromatic polyamide so as to have a high-Tg polymer as the matrix of the composite reinforcement.

Said multilayer structure may comprise up to 10 sealing layers and up to 10 composite reinforcing layers.

It is obvious that said multilayer structure is not necessarily symmetrical and that it may therefore comprise more sealing layers than composite layers or vice versa.

Advantageously, said multilayer structure comprises one, two, three, four, five, six, seven, eight, nine or ten sealing layers and one, two, three, four, five, six, seven, eight, nine or ten composite reinforcing layers.

Advantageously, said multilayer structure comprises one, two, three, four or five sealing layers and one, two, three, four or five composite reinforcing layers.

Advantageously, said multilayer structure comprises one, two or three, sealing layers and one, two, or three composite reinforcing layers.

Advantageously, they consist of compositions which respectively comprise different polymers.

Advantageously, they consist of compositions which respectively comprise polyamides corresponding to the polyamides P1i and P2j.

Advantageously, they consist of compositions which respectively comprise different polyamides.

In one embodiment, said multilayer structure comprises a single sealing layer and several reinforcing layers, said sealing layer being welded to said adjacent reinforcing layer.

In another embodiment, said multilayer structure comprises a single reinforcing layer and several sealing layers, said reinforcing layer being welded to said adjacent sealing layer.

In one advantageous embodiment, said multilayer structure comprises a single sealing layer and a single composite reinforcing layer which are welded.

All combinations of these two layers are therefore within the scope of the invention, provided that at least said innermost composite reinforcing layer is welded to said outermost adjacent sealing layer, the other layers being welded together or not.

Advantageously, in said multilayer structure, each sealing layer consists of a composition comprising the same type of polymer P1i, in particular a polyamide.

The expression "same type of polymer" means, for example, a polyamide which may be the same or a different polyamide depending on the layers.

Advantageously, said polymer P1i is a polyamide and said polymer P2j is a polyamide.

Advantageously, the polyamide P1i is identical for all the sealing layers.

Advantageously, said polymer P1i is a long-chain aliphatic polyamide, in particular PA1010, PA 1012, PA 1212, PA11, PA12, especially PA 11 or PA12.

Advantageously, the polyamide P1i is a long-chain semi-aromatic polyamide, in particular PA 11/5T, PA 11/6T or PA 11/10T. Obviously, in this case, the content of 11 must be carefully chosen such that the Tm of said polymers is less than 280° C., in particular less than 265° C.

Advantageously, in said multilayer structure, each reinforcing layer consists of a composition comprising the same type of polymer P2j, in particular a polyamide.

Advantageously, the polyamide P2j is identical for all the reinforcing layers.

Advantageously, said polymer P2j is a semi-aromatic polyamide, in particular chosen from a PA MXDT/6T, a PA 11/10T, a PA 11/BACT, a PA 5T/10T, a PA 11/6T/10T, a PA MXDT/10T, a PA MPMDT/10T, a PA BACT/10T, a PA BACT/6T, PA BACT/10T/6T, a PA 11/BACT/6T, a PA 11/MPMDT/6T, a PA 11/MPMDT/10T, a PA 11/BACT/10T, a PA 11/MXDT/10T and a PA 5T/10T.

Advantageously, in said multilayer structure, each sealing layer consists of a composition comprising the same type of polymer P1 i, in particular a polyamide, and each reinforcing layer consists of a composition comprising the same type of polymer P2j, in particular a polyamide, provided that the polyamides P1i and P2j are different, that is to say that if the sealing layer(s) consist(s) of compositions comprising a long-chain aliphatic polyamide, then the sealing layer(s) consist(s) of compositions comprising a semi-aromatic polyamide.

Advantageously, said polymer P1i is a long-chain aliphatic polyamide, in particular PA1010, PA 1012, PA 1212, PA11, PA12, especially PA 11 or PA12, and said polymer P2j is a semi-aromatic polyamide, in particular chosen from among a PA MPMDT/6T, a PA PA11/10T, a PA 11/BACT, a PA 5T/10T, a PA 11/6T/10T, a PA MXDT/10T, a PA MPMDT/10T, a PA BACT/10T, a PA BACT/6T, PA BACT/10T/6T, a PA 11/BACT/6T, PA 11/MPMDT/6T, PA 11/MPMDT/10T, PA 11/BACT/10T, a PA 11/MXDT/10T and a PA 5T/10T.

Advantageously, said multilayer structure consists of a single reinforcing layer and a single sealing layer in which said polymer P1i is a long-chain aliphatic polyamide, in particular PA1010, PA 1012, PA 1212, PA11, PA12, especially PA 11 or PA12, and said polymer P2j is a semi-aromatic polyamide, in particular chosen from a PA MPMDT/6T, a PA PA11/10T, a PA 11/BACT, a PA 11/6T/10T a PA MXDT/10T, a PA MPMDT/10T, a PA BACT/10T, a PA BACT/6T, a PA BACT/10T/6T, a PA 11/BACT/6T, PA 11/MPMDT/6T, PA 11/MPMDT/10T, PA 11/BACT/10T, a PA 11/MXDT/10T.

Advantageously, said multilayer structure is a flexible pipe.

The maximum temperature of use Tu of said multilayer structure is above 50° C., in particular above 100° C.

In one embodiment, said multilayer structure defined above has decompression resistance and drying ability.

Indeed, when storing or transporting gas, said gas can diffuse through the sealing layer(s) from the inside of the tube or reservoir to the interface between the last sealing layer and the first composite reinforcing layer, due to the permeability of the sealing layer(s) to the transported or stored gas. The accumulation of gas at this location can generate a pressure that will lead to the collapse of the sealing layer(s), when the internal pressure of the tube or reservoir is lower than the pressure at the interface with the composite reinforcement, which can occur in particular when the pumping or transport of the gas is stopped during a production stoppage that leads to a drop in pressure of several hundred bar to atmospheric pressure or when the storage reservoir is empty. The same applies during internal water pressure tests of the reservoirs: this water is likely to migrate by permeation, at the interface between the composite reinforcement and the last sealing layer and will subsequently be very difficult to remove, leading to long and costly drying cycles of said storage reservoirs, especially under vacuum.

In another embodiment, said multilayer structure defined above further comprises a metallic carcass located within the sealing layer.

This metallic carcass is not leakproof and is the innermost layer.

Advantageously, said multilayer structure further comprises at least one outer layer, especially a metallic layer, said layer being the outermost layer of said multilayer structure.

Said outer layer is a second reinforcing layer but is metallic and not composite.

There may also be a polymeric protective layer (the outermost layer) on the structure, which has an anti-abrasion role or which allows an inscription to be placed on the structure.

Regarding the Fibrous Material

Regarding the fibers making up said fibrous material, they are in particular mineral, organic or plant fibers.

Advantageously, said fibrous material may be sized or unsized.

Said fibrous material can therefore comprise up to 0.1% by weight of an organic material (thermosetting or thermoplastic resin type) called sizing.

Among the fibers of mineral origin, mention may be made of carbon fibers, glass fibers, basalt fibers or basalt-based fibers, silica fibers, or silicon carbide fibers, for example. The organic fibers include thermoplastic or thermosetting polymer-based fibers, such as semi-aromatic polyamide fibers, aramid fibers or polyolefin fibers, for example. Preferably, they are amorphous thermoplastic polymer-based and have a glass transition temperature Tg higher than the Tg of the polymer or thermoplastic polymer mixture constituting the pre-impregnation matrix when the latter is amorphous, or higher than the Tm of the polymer or thermoplastic polymer mixture constituting the pre-impregnation matrix when the latter is semi-crystalline. Advantageously, they are semi-crystalline thermoplastic polymer-based and have a melting temperature Tm higher than the Tg of the polymer or thermoplastic polymer mixture constituting the pre-impregnation matrix when the latter is amorphous, or higher than the Tm of the polymer or thermoplastic polymer matrix mixture constituting the pre-impregnation matrix when the latter is semi-crystalline. Thus, there is no melting risk for the organic fibers constituting the fibrous material during the impregnation by the thermoplastic matrix of the final composite. The plant fibers include natural linen, hemp, lignin, bamboo, silk, in particular spider silk, sisal, and other cellulose fibers, in particular viscose. These plant fibers can be used pure, treated or coated with a coating layer, in order to facilitate the adherence and impregnation of the thermoplastic polymer matrix.

The fibrous material may also be a fabric, a braid or woven with fibers.

It can also correspond to fibers with support threads.

These component fibers may be used alone or in mixtures. Thus, organic fibers can be mixed with the mineral fibers to be pre-impregnated with thermoplastic polymer powder and to form the pre-impregnated fibrous material.

The organic fiber strands can have several grammages. They can further have several geometries. The component fibers of the fibrous material can further assume the form of a mixture of these reinforcing fibers with different geometries.

The fibers are continuous fibers.

The fibrous material is preferably selected from glass fibers, carbon fibers, basalt fibers and basalt-based fibers.

More advantageously, the fibrous material is selected from carbon fibers, basalt fibers and basalt-based fibers.

It is used in the form of a roving or several rovings.

According to another aspect, the present invention relates to a method of manufacturing a multilayer structure as defined above, characterized in that it comprises a step of welding the reinforcing layer as defined above to the sealing layer as defined above.

Advantageously, the welding step is performed by a system selected from laser, infrared heating or induction heating.

Advantageously, said method comprises a step of extruding said sealing layer onto a metallic carcass and a step of welding the reinforcing layer onto the sealing layer.

According to another aspect, the present invention relates to the use of a multilayer structure selected from a reservoir or pipe or tube comprising, from the inside to the outside, at least one sealing layer as defined above and at least one composite reinforcing layer as defined above, said innermost composite reinforcing layer being welded to said outermost adjacent sealing layer, said sealing layers consisting of a composition predominantly comprising at least one semi-crystalline thermoplastic polymer $P1i$ ($i=1$ to $n$, $n$ being the number of sealing layers), the Tm of which, as measured according to ISO 11357-3: 2013, is less than 280° C., in particular less than 265° C., said at least one thermoplastic polymer of each sealing layer may be the same or different, and at least one of said composite reinforcing layers consisting of a fibrous material in the form of continuous fibers impregnated with a composition predominantly comprising at least one thermoplastic polymer $P2j$, ($j=1$ to $m$, $m$ being the number of reinforcing layers), in particular semi-crystalline, said thermoplastic polymer $P2j$ having a Tg, as measured according to ISO 11357-3: 2013, greater than the maximum temperature of use of said structure (Tu), where $Tg \geq Tu+20°$ C., especially $Tg \geq Tu+30°$ C., Tu being greater than 50° C., in particular greater than 100° C., for preparing a reservoir or pipe or tube for transporting or storing gas or for exploiting oil or gas deposits under the sea, transport or storage of hydrogen being excluded, and a reservoir or pipe or tube for transporting or storing gas, and a multilayer structure selected from a reservoir, a pipe or a tube for transporting or storing hydrogen being excluded.

EXAMPLES

In all examples, the reservoirs are obtained by rotational molding of the liner at a temperature adapted to the nature of the thermoplastic resin used, but in all cases below 280° C.

The tubes are obtained by extrusion of the liner at a temperature suited to the nature of the thermoplastic resin used, but in all cases less than 280° C.

In the case of epoxy, a wet filament winding process is then used, which consists of winding fibers around the liner, which fibers are pre-impregnated in a liquid epoxy bath. The reservoir is then polymerized in an oven for 2 hours.

In all other cases, a fibrous material previously impregnated with the thermoplastic resin (tape) is used. This tape is deposited by filament winding using a robot comprising a 1500 W laser heater at a speed of 12 m/min.

Example 1 (Counterexample)

Flexible wastewater transport tube (offshore application) composed of an epoxy (Tg 130° C.)—T700SC31E carbon fiber composite reinforcement and a HDPE sealing layer: no miscibility between the 2 resins (see Table I) which prevents any weld between the fibrous reinforcement and the sealing layer.

Example 2

Type IV or V gas (natural gas) storage reservoir, composed of a BACT/10T—T700SC31E carbon fiber composite reinforcement and a PA6 sealing layer: good partial miscibility between the 2 resins (see Table 1) which allows a good weld between the fibrous reinforcement and the sealing layer.

Example 3

Type IV or V gas (natural gas) storage reservoir composed of a BACT/10T—T700SC31E carbon fiber composite reinforcement and a PA66 sealing layer: good partial miscibility between the 2 resins (see Table 1) which allows a good weld between the fibrous reinforcement and the sealing layer.

Example 4

Flexible pipe used for pumping oil composed of a BACT/10T—T700SC31E carbon fiber composite reinforcement and a PA11 sealing layer deposited on an inner metallic carcass: low partial miscibility between the 2 resins (see Table 1) which leads to a poor-quality weld between the fibrous reinforcement and the sealing layer.

Example 5

Flexible pipe used for pumping oil composed of an 11/BACT/10T—T700SC31E carbon fiber composite reinforcement and a PA11 sealing layer deposited on an inner metallic carcass: good partial miscibility between the 2 resins (see Table 1) which leads to a good weld between the fibrous reinforcement and the sealing layer.

In all the examples in Table 1 below, to evaluate the miscibility of the resins, the mixtures were produced from powders with a particle size of about 150 μm on micro-DSM with a recirculation time of 1 minute after melting. All mixtures were made at 300° C., except for the epoxy-polyethylene mixture which was made at 220° C.

At the end of the mixing process, the mixture is injected into a mold to make a test piece which will be characterized in DMA.

TABLE 1

| | Type of resin | Mixture (50/50 by weight) | Tg of each pure resin (Tg P1 and Tg P2) | Tg of each resin in the mixture (Tg P'1 and Tg P'2) | Ratio of the difference between the Tgs of the resin in the mixture and the Tgs of each pure resin (Tg P'2−Tg P'1)/(Tg P'2−Tg P'1) (%) |
|---|---|---|---|---|---|
| Example 1 | Epoxy HDPE | Epoxy + HDPE | 130 −100 | 130 −100 | 100 |
| Example 2 | BACT/10T PA6 | BACT/10T + PA6 | 178 50 | 109 94 | 12 |
| Example 3 | BACT/10T PA66 | BACT/10T + PA66 | 178 60 | 110 96 | 12 |
| Example 4 | BACT/10T PA11 | BACT/10T + PA11 | 178 50 | 168 71 | 76 |
| Example 5 | 11/BACT/10T PA11 | 11/BACT/10T + PA11 | 168 50 | 115 90 | 21 |

Miscibility Test Results:
  column 4: glass transition temperature of each resin before mixing
  column 5: glass transition temperature of resins in the mixture
  column 6: ratio between the differences in glass transition temperature of the resins in the mixture and before mixing.
  100% indicates non-miscibility of the resins,
  <80% indicates low miscibility,
  <30% indicates good but partial miscibility,
  0 indicates full miscibility.

The invention claimed is:

1. A multilayer structure selected from a reservoir, a pipe or a tube for transporting or storing gas or for exploiting oil or gas deposits under the sea, comprising, from the inside to the outside, at least one sealing layer and at least one composite reinforcing layer,
an innermost composite reinforcing layer being welded to an outermost adjacent sealing layer,
said at least one sealing layer consisting of a composition predominantly comprising at least one semi-crystalline thermoplastic polymer P1i (i=1 to n, n being the number of sealing layers), the Tm of which, as measured according to ISO 11357-3:2013, is less than 280° C.,
said at least one semi-crystalline thermoplastic polymer of each sealing layer may be the same or different, and
at least one of said at least one composite reinforcing layer consisting of a fibrous material in the form of continuous fibers impregnated with a composition predominantly comprising at least one thermoplastic polymer P2j, (j=1 to m, m being the number of reinforcing layers), said thermoplastic polymer P2j having a Tg, as measured according to ISO 11357-3:2013, greater than the maximum temperature of use of said structure (Tu), with Tg ≥Tu+20° C., Tu being greater than 50° C.,
hydrogen being excluded from said transporting or storing gas, and a multilayer structure selected from a reservoir, a pipe or a tube for transporting or storing hydrogen being excluded,
wherein each polymer P1i of each sealing layer is partially or fully miscible with each polymer P1i of the adjacent layer(s), each polymer P2j of each reinforcing layer is partially or fully miscible with each polymer P2j of the adjacent layer(s), and the polymer P2j is partially or fully miscible with polymer P1i adjacent thereto,
the total or partial miscibility of said polymers being defined by the difference in glass transition temperature of the two resins, in the mixture, relative to the difference in glass transition temperature of the two resins, before mixing, and the miscibility being total when said difference is equal to 0, and the miscibility being partial when said difference is different from 0 wherein said polymer P1i and said polymer P2j are polyamides.

2. The multilayer structure according to claim 1, wherein each sealing layer comprises the same type of polymer.

3. The multilayer structure according to claim 1, wherein each reinforcing layer comprises the same type of polymer.

4. The multilayer structure according to claim 1, wherein each sealing layer comprises the same type of polymer, and each reinforcing layer comprises the same type of polymer.

5. The multilayer structure according to claim 1, wherein the multilayer structure has a single sealing layer and a single reinforcing layer.

6. The multilayer structure according to claim 1, wherein said multilayer structure is a flexible pipe.

7. The multilayer structure according to claim 1, wherein said composition comprising said at least one semi-crystalline thermoplastic polymer P1i and said composition comprising at least one thermoplastic polymer P2j each comprises additives, enabling them to absorb radiation suitable for welding.

8. The multilayer structure according to claim 1, wherein said composition comprising said polymer P2j is transparent to radiation suitable for welding.

9. The multilayer structure according to claim 7, wherein the welding is carried out by a system selected from laser, IR heating or induction heating.

10. The multilayer structure according to claim 1, wherein said polymer P1i is a long-chain aliphatic polyamide, or semi-aromatic.

11. The multilayer structure according to claim 1, wherein said polymer P2j is a semi-aromatic polyamide.

12. The multilayer structure according to claim 1, wherein said polymer P1i is a long-chain aliphatic polyamide, or semi-aromatic, and said polymer P2j is a semi-aromatic polyamide.

13. The multilayer structure according to claim 1, wherein the multilayer structure has decompression resistance and drying ability.

14. The multi-layer structure according to claim 1, wherein said structure further comprises a metallic carcass located within the sealing layer.

15. The multilayer structure according to claim 1, wherein said structure further comprises at least one outer layer, said outer layer being the outermost layer of said multilayer structure.

16. The multilayer structure according to claim 1, wherein the fibrous material is selected from glass fibers, carbon fibers, basalt fibers and basalt-based fibers.

17. A method for manufacturing a multilayer structure as defined in claim 1, wherein the method comprises a step of welding the reinforcing layer onto the sealing layer.

18. The method according to claim 17, wherein the welding step is carried out by a system selected from laser, infrared heating or induction heating.

19. The method according to claim 17, the method comprises a step of extruding said sealing layer onto a metallic carcass and a step of welding the reinforcing layer onto the sealing layer.

* * * * *